United States Patent [19]

Warda et al.

[11] 4,042,353

[45] Aug. 16, 1977

[54] METHOD AND APPARATUS FOR FILTERING THROUGH PARTICULATE MATERIAL

[75] Inventors: Richard D. Warda, Fort Saskatchewan; Robert K. Buhr, Kanata; John E. Rehder, Montreal, all of Canada

[73] Assignee: Canadian Patents and Development Limited, Ottawa, Canada

[21] Appl. No.: 544,623

[22] Filed: Jan. 27, 1975

[30] Foreign Application Priority Data

Feb. 22, 1974 Canada ..................................... 193274

[51] Int. Cl.² ............................................. B01D 46/32
[52] U.S. Cl. ............................................. 55/99; 55/479
[58] Field of Search ................. 55/98, 99, 96, 79, 474, 55/476, 479, 482, 350; 23/288 G; 34/57 R, 57 A, 10; 432/58, 14; 209/138–141

[56] References Cited

U.S. PATENT DOCUMENTS

| 1,570,869 | 1/1926 | Thompson et al. ........................ 55/99 |
| 2,156,924 | 5/1939 | Schneider ............................ 34/57 R |
| 2,834,119 | 5/1958 | Schaub ..................................... 55/79 |

FOREIGN PATENT DOCUMENTS

| 25,044 | 1965 | Japan ......................................... 55/79 |
| 21,675 | 6/1924 | United Kingdom ................... 55/474 |
| 1,057,776 | 2/1967 | United Kingdom |

*Primary Examiner*—Bernard Nozick
*Attorney, Agent, or Firm*—Francis W. Lemon

[57] ABSTRACT

A first feed comprising particulate material predominantly in the size range 30 mesh to ½ in. is fed into an upper portion of an upwardly extending casing, and is a major portion of the particulate material. A second feed, which is a minor portion of the particulate material, comprises at least 50% by weight of fines predominantly in the range 140 mesh to 30 mesh, the remainder being superfines, is also fed into the casing. A gas is fed upwardly along at least a portion of the casing so that the coarse particles, a major portion of the fines and a minor portion of the superfines freely gravitate down the casing in counterflow to the flow of a major portion of the gas and form a packed particulate bed in a container beneath the casing. A particulate exit flow rate device such as a screw conveyor maintains the height of the packed particulate bed so that it covers a louvered packed particulate bed retaining, gas inlet to and a louvered packed particulate bed retaining, gas outlet from the container and also causes the major portion of the gas to flow upwardly along the casing. The superfines and any remaining fines are entrained in the gas, carried upwardly along the casing and then conveyed by the gas pressure in the casing along a pipe, from the top of the casing, downwardly to the packed particulate bed retaining, gas inlet to the packed particulate bed. The major portion of the superfines and any remaining fines are filtered from the gas and the gas leaves the container by the packed particulate bed retaining, gas outlet. An inclined baffle is provided in the casing to direct particulate material towards the louvered packed particulate bed retaining, gas inlet, so that there is a predominance of finer particles adjacent the louvered packed particulate bed retaining, gas inlet. The fines and the superfines may be fed into the casing with the coarse particulate material, with the gas or independently provided that a major portion of the fines and a minor portion of the superfines gravitate down the casing with the coarse particles in counterflow to the flow of the major portion of the gas.

6 Claims, 9 Drawing Figures

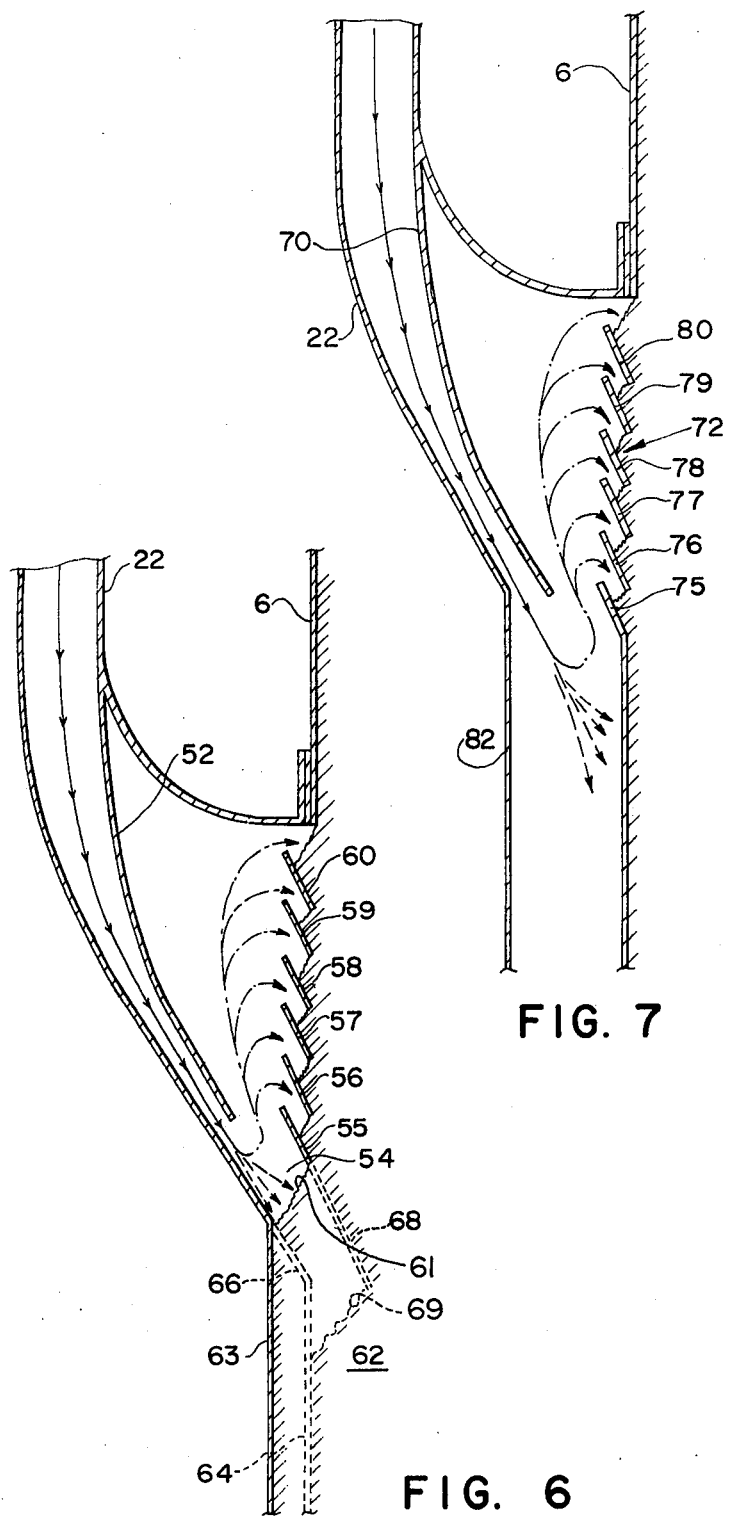

METHOD AND APPARATUS FOR FILTERING THROUGH PARTICULATE MATERIAL

This invention relates to a method and apparatus for treating solid particulate material with a gas.

There are two known method of facilitating the interaction of a large mass of heat-bearing and/or reactive gas with an unconsolidated mass of particulate material, in which a wide range of particulate sizes exist, in order to cause heat transfer and/or chemical reaction between the gas and the mass of particulate material. One of the methods is to use a fluidized bed and this has the disadvantage that expensive dust collection equipment must be installed to recover fine particles of the particulate material that become entrained in the fluidizing gas stream. The other method is the packed particulate bed process and this process has the limitation that a wide range of particle sizes of the particulate material to be treated, in particular the fraction of superfine particles of say 70 mesh and smaller, reduces the permeability of the packed particulate bed at an acceptable mass flow rate. Furthermore, a portion of the superfines are removed from the packed particulate bed by the gas and are entrained in the gas and constitute a potential hazard similar to that associated with the fluidized bed, but lesser in degree.

Thus it would be desirable to provide a method and an apparatus for the treatment of a particulate material with a treating gas wherein the mass flow rate of the treating gas can be increased without incurring a loss of fines and superfines of the particulate material by entrainment in the treating gas, and without incurring an unacceptably high pressure drop by the treating gas passing through the particulate material.

It is an object of the present invention to provide a method and apparatus for the treatment of a particulate material with the treating gas wherein the mass flow rate of the treating gas can be increased without incurring a loss of fines and superfines of the particulate material by entrainment in the treating gas, and without incurring an unacceptably high pressure drop by the treating gas passing through the particulate material.

It is a further object of the present invention to provide a method and apparatus for treating particulate material which uses a packed particulate bed and which can be used with particulate material containing both fine and superfine particles without incurring the problems of an undesirable reduction in the permeability of the packed particulate bed and the collection of dust from the fluid bed process.

It will be readily apparent to persons skilled in the art that the present invention, from reading the following description thereof, can be used not only to reduce air pollution but at the same time to increase the efficiency of the particular process to which it is applied, and reduce material and energy requirements for that process.

In this specification a packed particulate bed is a packed bed composed solely of packed particulate material as distinct from a packed bed containing say lessing rings or saddles.

According to the present invention, there is provided a method of treating a solid particulate material with a gas, comprising:

a. feeding, as a major portion of the particulate material to be treated, a first feed comprising coarse particles predominantly in the range 30 mesh to ½ inch into an upper portion of an upwardly extending, elongated casing, b. feeding a particulate material treating gas into the casing at a position below the first feed thereto and below a gas outlet therefrom, c. feeding, as a minor portion of the particulate material to be treated, a second feed comprising at least 50% by weight of fines predominantly in the range 140 mesh to 30 mesh, the remainder being superfines, into the upwardly, extending, elongated casing at a position at least as high as the level at which the treating gas is fed thereto, d. allowing feeding a particulate material treating gas upwardly along at least a portion of the casing so that the coarse particles of the first feed, and at least a major portion of the fines, and a minor portion of the superfines, of the second feed, to freely gravitate downwardly in the casing in counterflow to the flow of substantially all of the gas to the gas outlet, and accumulate as a packed particulate bed in a container sealed to the lower end of the casing and above means controlling the exit flow rate of particulate material from the container, e. maintaining, by the means controlling the exit flow rate of the particulate material from the container, the height of the packed bed so that it:

i. covers a lowered packed particulate bed retaining, gas inlet to one side of the container for passage of gas, fines and superfines to the packed bed therein, ii. covers a lowered packed particulate bed retaining, gas outlet facing the louvered, packed particulate bed retaining gas inlet from another side of for the passage of gas from the packed bed therein, and iii. causes substantially all of the treating gas to flow upwardly as a gas stream along the casing so that the remaining superfines and any remaining fines are entrained in the gas stream and are carried thereby upwardly along the casing as entrained particles solely to the gas outlet from the casing, f. conveying the entrained particles by means of the gas stream pressure in the casing, from the casing having a substantially unobstructed bore and extending along a curved path, downwardly along a pipe to the louvered packed particulate bed retaining, gas inlet, g. conveying at least a finer fraction of the entrained particles than the remainder through the louvered packed particulate bed retaining, gas inlet by the gas stream, h. filtering a substantial portion of the entrained particles, conveyed by the gas stream through the packed particulate bed retaining, gas inlet, by passage of these entrained particles and at least a substantial portion of the gas stream through the packed particulate bed, in a transverse direction to the direction of flow of the packed particulate bed, towards louvered packed particulate bed retaining, gas outlet, and i. conveying gas of the gas stream escaping from the container through the louvered packed particulate bed retaining, gas outlet and away therefrom, and wherein j. the particulate material gravitating downwardly in the casing is directed by means of an inclined baffle towards a portion of the container interior adjacent the louvered, packed particulate bed retaining, gas inlet, so that the packed particulate bed has a predominance of the relatively finer particles therein adjacent the louvered, packed particulate bed retaining gas inlet, and a predominance of the relatively coarser particles therein adjacent the louvered, packed particulate bed retaining, gas outlet.

Further according to the present invention there is provided an apparatus for treating a solid particulate material with a gas, comprising:
   a. an upwardly extending, elongated casing having a gas outlet and inlet means for:
      i. as a major portion of the particulate material to be treated, a first feed comprising coarse particles predominantly in the range of 30 mesh to ½ inch, to an upper portion of the casing,
      ii. a particulate material treating gas at a position which is below the first feed to the casing and below the gas outlet,
      iii. as a minor portion of the particulate material to be treated, a second feed comprising at least 50% by weight of fines predominantly in the range 140 mesh to 30 mesh, the remainder being superfines, at a position at least as high as the level at which the treating gas is fed to the casing, whereby, in operation,
      iv. a particulate material treating gas, will flow upwardly along at least a portion of the casing, in counterflow to the coarse particles of the first feed and at least a major portion of the fines and a minor portion of the superfines of the second feed, all of which will freely gravitate downwardly in the casing,
   b. a packed particulate bed container beneath the said inlet means, having a particulate material outlet at the lower end thereof, and attached and sealed at the upper end to the lower end of the casing, for receiving therefrom, as particulate material, the coarse particles of the first feed, and the fines and superfines of the second feed, that will freely gravitate downwardly along the casing,
   c. means attached to the particulate material outlet of the packed particulate bed container, for controlling the exit flow rate of particulate material therethrough, and in operation, retaining a packed particulate bed at a level in the packed particulate bed container so that a major portion of the treating gas entering the casing will flow upwardly therealong to the gas outlet entraining a major portion of superfines therein, and any fines not freely gravitating downwardly therein,
   d. a louvered packed particulate bed retaining, gas inlet to the packed particulate bed container, and below the packed particulate bed level thereof, for the passage of treating gas containing entrained particles thereto,
   e. a louvered packed particulate bed retaining, gas outlet in another side of the packed particulate bed container, below the packed particulate bed level thereof and facing the louvered packed particulate bed retaining, gas inlet, for the passage of treating gas therefrom,
   f. a pipe having a substantially unobstructed bore with an inlet end thereof connected to the gas outlet from the casing, for conveying therefrom solely by means of the gas pressure in the casing treating gas flowing upwardly along the casing with entrained particles, and an outlet end connected to the louvered packed particulate bed retaining, gas inlet, for delivering the treating gas and entrained particles therethrough to the packed, particulate bed therein, such that entrained particles will be filtered from the treating gas and at least a major portion of the treating gas will leave the packed particulate bed container through the louvered packed particulate bed retaining, gas outlet, and
   g. an inclined baffle is provided in the container at a position above the louvered, packed particulate bed retaining, gas inlet and the louvered, packed particulate bed retaining, gas outlet, for directing particulate material gravitating downwardly therein towards a portion of the container interior adjacent to the wall of the container containing the louvered, packed particulate bed retaining, gas inlet and form an inclined surface on a packed particulate bed sloping downwardly towards the wall of the container containing the louvered, packed particulate bed retaining, gas outlet.

In the accompanying drawings which illustrate, by way of example, embodiments of the present invention:

Figures 1, 2:
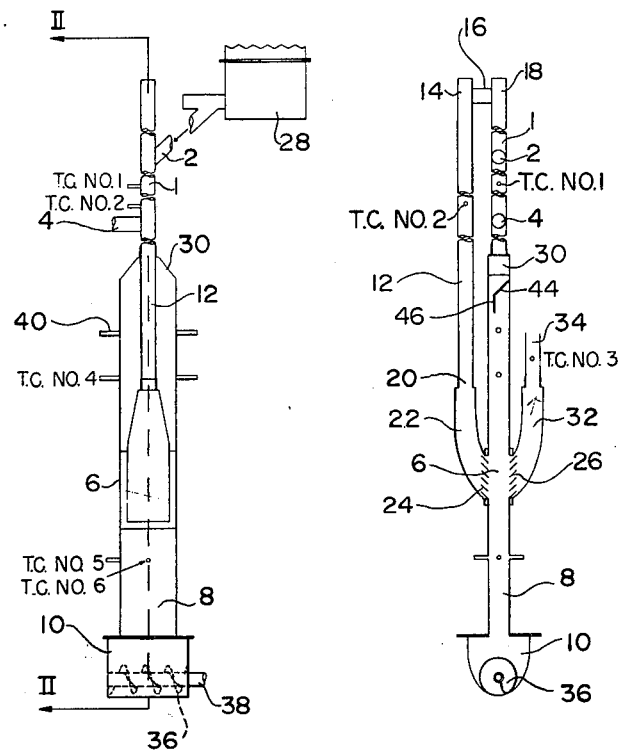
FIG. 1 is a side view of an apparatus for treating a particulate material.
FIG. 2 is a sectional side view along II—II, FIG. 1.
Figure 3:
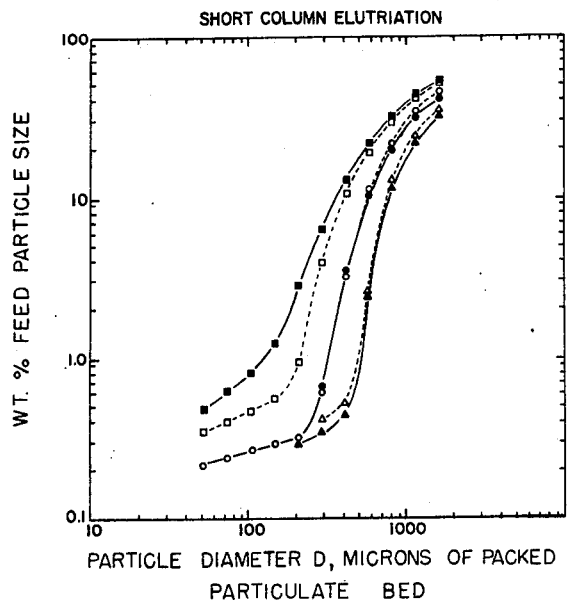
Figure 4:
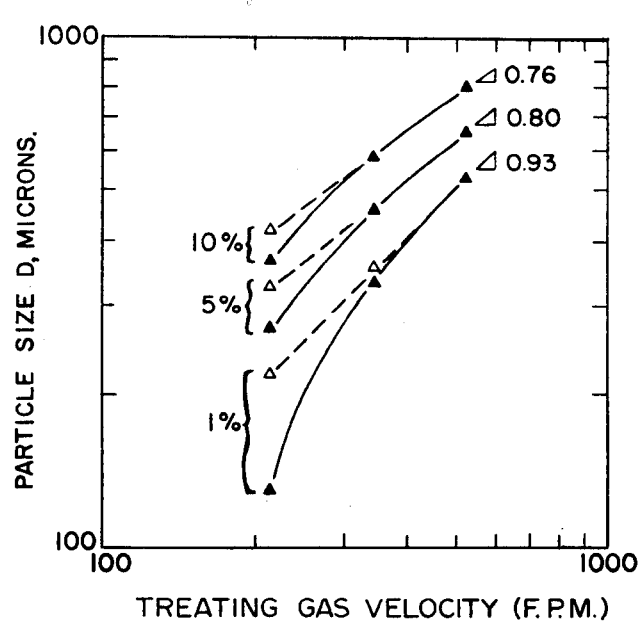
Figure 5:
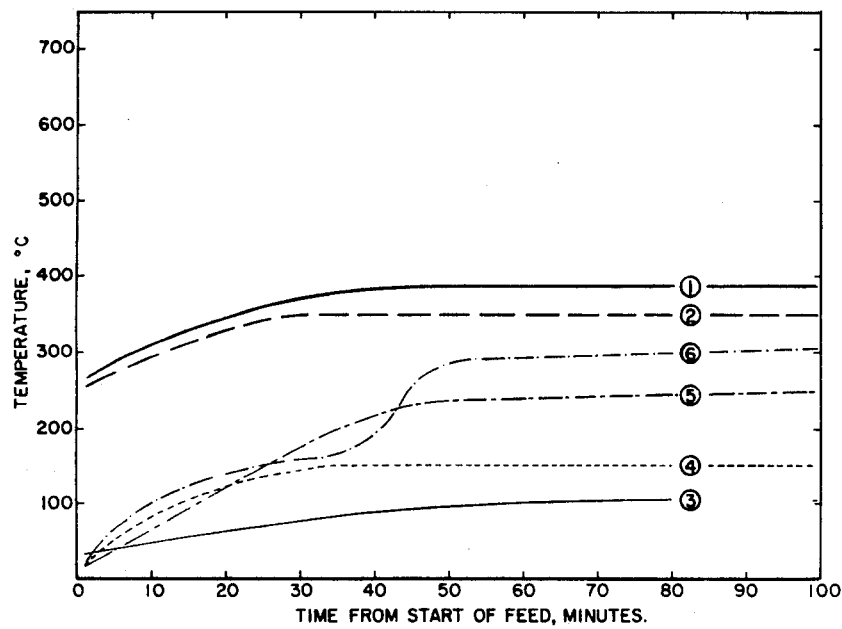
Figures 8, 9:
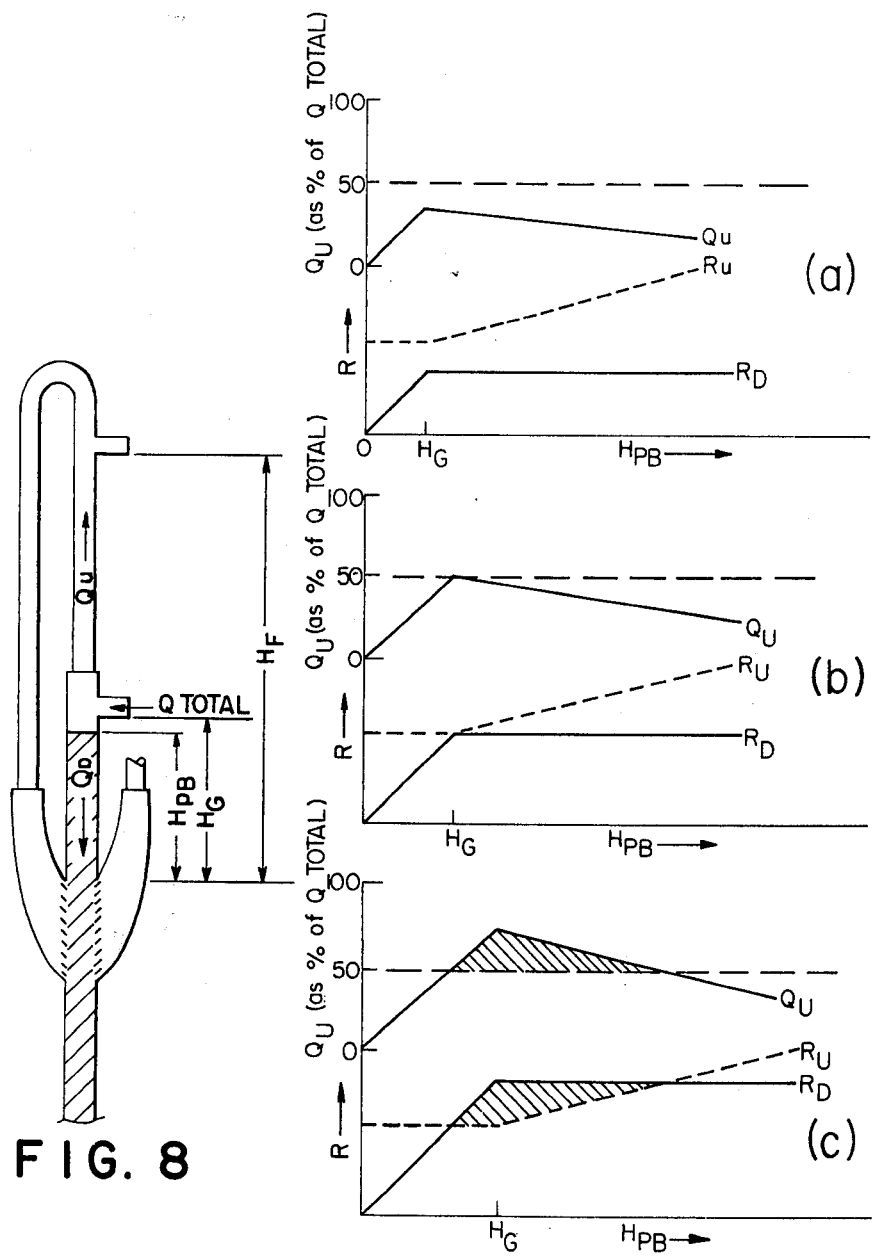

FIG. 3 is a graph, with the apparatus shown in FIGS. 1 and 2 used for coke even feed and wherein the particle size distribution of the packed particulate bed material is plotted as a function of the treating gas velocity and coal feed rate, FIG. 4 is another graph of the apparatus shown in FIGS. 1 and 2 used for coke oven feed and wherein the lower particle size limit of the packed particulate bed is plotted as a function of the feed rate of the particulate material and velocity of the treating gas, FIG. 5 is another graph of the apparatus shown in FIGS. 1 and 2 used for coke oven feed and wherein the temperature of the treating gas and/or particulate material at various positions is plotted against the time which the apparatus had been operating, FIG. 6 is an enlarged sectional side view of a different packed particulate bed retaining inlet for use with the apparatus shown in FIGS. 1 and 2, and is beneath FIG. 7, FIG. 7 is an enlarged sectional side view of a different delivery of entrained particles and treating gas to the packed bed, and for use with the apparatus shown in FIGS. 1 and 2, FIG. 8 is a schematic side view of the apparatus shown in FIG. 1 showing various parameters which influence the magnitude and direction of the flow of the treating gas in the apparatus, and FIG. 9 consists of three schematic diagrams showing various relationships between the flow of treating gas within the apparatus shown in FIG. 7 and parameters designated therein.

In FIGS. 1 and 2 there is shown an apparatus for treating particulate material, comprising:
   a. an upwardly extending, elongated casing 1 having a gas outlet in the form of a pipe 16 and inlet means for:
      i. as a major portion of the particulate material to be treated, a first feed comprising coarse particles predominantly in the range 30 mesh to ½ inch, to an upper portion of the casing, in the form of inlet 2,
      ii. a particulate material treating gas, in the form of inlet 4, at a position which is below the first feed to the casing 1, that is inlet 2, and below the gas outlet, that is pipe 16,
      iii. as a minor portion of the particulate material to be treated, a second feed comprising at least 50% by weight of fines predominantly in the range 140 mesh to 30 mesh, the remainder being superfines, also in the form of inlet 2, at a position at least as high as the level at which the treating gas is fed to the casing 1, that is inlet 4, whereby, in operation,
      iv. a particulate material treating gas, will flow upwardly along at least a portion of the casing 1 to the gas outlet pipe 16, in counterflow to the coarse particles of the first feed and at least a major portion of the fines and a minor portion of the superfines of the second feed all of which will freely gravitate downwardly in the casing 1, b. a packed particulate bed container 6 beneath the said inlet means, having a particulate material outlet 8 at the lower end thereof, and attached and sealed at the upper end to the lower end of the casing 1, for receiving therefrom, as particulate material, the coarse particles of the first feed, and the fines and superfines of the second feed, that will flow downwardly along the casing 1, c. means, in the form of screw conveyor 10, attached to the particulate material outlet of the packed particulate bed container, for controlling the exit flow rate of particulate material therethrough, and in operation, retaining a packed particulate bed at a level in the packed particulate bed container 6 so that a major portion of the treating gas entering the casing 1 will flow upwardly to the gas outlet pipe 16 entraining a maor portion of superfines therein, ad any fines not freely gravitate downwardly therein, d. a packed particulate bed retaining, gas inlet 24 to the packed particulate bed container 6, and below the packed particulate bed level thereof, for the passage of treating gas containing entrained particles thereto, e. a packed particulate bed retaining, gas outlet 26 from the packed particulate bed container 6, below the packed particulate bed level thereof and facing the packed particulate bed retaining, gas inlet 24, for the passage of treating gas therefrom, and f. a pipe 12 having a substantially unobstructed bore with an inlet end 14 connected to the gas outlet a pipe 16 to a portion 18 of the casing 1, for conveying therefrom treating gas solely by means of the gas pressure in the casing 1 the flowing upwardly along the casing 1 inch, and with entrained particles, and an outlet end 20 connected by a curved inlet connection 22 to the packed particulate bed, gas retaining inlet 24, for delivering the treating gas and entrained particles therethrough to a packed, particulate bed therein, such that entrained particles will be filtered from the treating gas and at least a major portion of the treating gas will leave the packed particulate bed container 6 through the packed particulate bed retaining, gas outlet 26.

Escaping treating gas from the packed particulate bed retaining outlet 26 passes along a curved outlet connection 32.

The inlet 2 is connected to a conveyor screw 28 for delivering the first and second feeds as a mixture. The casing 1 has 2 in. diameter bore and the distance between the centers of the inlet 2 and the inlet 4 is 35 ins. The container 6 has an internal cross-section which is 3 in. by 8 in. and is 48 ins. long. A tapered connecting piece 30 connects the casing 1 to the container 6. The pipes 12 and 16 have 2 in. diameter bores and the curved inlet and outlet connections 22 and 32 each have an internal, horizontally extending cross-section at their upper ends of 3 in. by 3 in., and both increase in internal cross-section in the downward direction to a vertical cross-section of 6 in. by 6 in. at the packed particulate bed retaining inlet 24 and outlet 26 respectively. The curved outlet connection 32 is connected at its upper end to a 2 in. diameter exhaust pipe 34 for conveying escaping treating gas to atmosphere.

The cross-sectional areas of the packed particulate bed retaining inlet 24 and outlet 26 are each 6 in. by 6 in., and each contains five 1¼ in. wide by 1/16 in. thick louvres which are inclined at approximately 30° to the vertical plane.

The particulate material outlet 8 has an internal cross-section which is 3 in. by 8 in., and the screw conveyor 10 has a 5 in. diameter screw 36 and 1½ in. diameter bore outlet 38. The overall height of the apparatus is 128 ins. An inspection port 40 is provided in the casing 1, and thermocouples designated T.C. No. 1 to T.C. No. 6 are provided at various positions in the apparatus.

In operation, as a major portion of the particulate material, a first feed comprising coarse particles predominantly in the range 30 mesh to ½ inch, and as a minor portion of the particulate material, a second feed comprising at least 50% by weight of fines predominantly in the range 140 mesh to 30 mesh, the remainder being superfines, are fed by screw conveyor 28 into an upper portion of the casing 1. A treating gas at an appropriate velocity, which is preferably in the range 300 ft/min. to 500 ft/min. for coke oven feeding, is fed into a intermediate, lengthwise portion of the casing 1. The coarse particles, at least a major portion of the fines, and a minor portion of the superfines, gravitate downwardly in the casing 1 in counterflow to the major portion of the gas flowing upwardly as a gas stream along the casing 1, and accumulate as a packed particulate bed in the container 6 at the lower end of the casing 1 and above screw conveyor 10 controlling the exit flow rate of the packed particulate bed material from the container 6. The remaining superfines and any remaining fines are entrained in the gas stream as entrained particles and are carried upwardly along the casing 1 to the pipe 16 to be conveyed therealong solely by means of the gas stream pressure in the casing 1.

The screw conveyor 10 controls the exit flow rate of the packed particulate bed material from the container 6, so that the height of the packed bed in the container 6 is such that it:

i. covers the packed particulate bed retaining, gas inlet 24 for the passage of gas, fines and superfines to the packed bed, ii. covers the packed particulate bed retaining, gas outlet 26 for the passage of gas from the packed bed, and iii. causes the major portion of the gas to flow upwardly as the gas stream along the casing 1 so that, as described above, the remaining superfines and any remaining fines are entrained in the gas stream and are carried thereby upwardly along the casing 1 as entrained particles.

The entrained particles are then conveyed by means of the gas stream, from the upper end portion of the casing 1, along the pipe 16, downwardly along pipe 12 and curved inlet connection 22, and through the packed particulate bed retaining, gas inlet 24. A substantial portion of the entrained particles are then filtered from the gas stream by passage of the entrained particles and gas streams, in a transverse direction through the packed particulate bed in container 6, towards the packed particulate bed retaining, gas outlet 26. The gas stream is allowed to escape from the container 6 through the packed particulate bed retaining, gas outlet 26 and along the curved outlet connection 32 and exhaust pipe 34 to atmosphere.

An internal baffle 44 is provided in the container 6 at a position above the packed particulate bed retaining, gas inlet 24 and the packed particulate bed retaining, gas outlet 26, to direct a substantial portion of the particulate material gravitating downwardly in the container 6 towards a portion of the interior of the container 6 adjacent to a wall of the container containing the packed particulate bed retaining, gas inlet 24.

The baffle 44 is preferably inclined at an angle of less than 45° to the vertical and may have a lower vertical extension 46.

The inclined baffle 44 should extend as far as possible across the interior of the container 6, from the side thereof containing the packed particulate bed retaining, gas outlet 26, without impeding the flow of the largest particles gravitating downwardly in the container 6, and a distance of approximately ¾ of the width of the interior of the container 6 has been found suitable for this purpose.

The inclined baffle 44 has the desirable effect of directing all of the downwardly gravitating particles towards the portion of the interior of the container 6 adjacent to the wall of the container 6, containing the particulate bed retaining, gas inlet 24. This results in the particulate material forming the packed particulate bed having an inclined surface sloping downwardly towards the wall of the container 6 containing the packed particulate bed retaining, gas outlet 26. This results in a change in the size distribution of the particles forming the packed particulate bed so that there is a predominance of fine particles adjacent the packed particulate bed retaining, gs inlet 24, and a predominance of the coarser particles adjacent the packed particulate bed retaining, gas outlet 26. Depending on the quantity of fines and superfines in the packed particulate bed, this has the desirable effect of considerably reducing any tendency of fines or superfines becoming entrained in gas leaving the packed particulate bed through the packed particulate bed retaining, gas outlet 26.

With the apparatus operating according to the present using the apparatus in this manner is feeding gas, containing the fines and superfines, into the treating gas entry 4 and the coarse particulate material, as previously defined according to particle size, into the particulate material entry 2 so that the coarse particles, a major portion of the fines and a minor portion of the superfines gravitate down the casing 1. The remaining fines and superfines in the gas stream are conveyed as previously described to the packed particulate bed retaining gas inlet 24 and are substantially removed from the gas by the filtering action of the gas passing transversely through the packed particulate bed.

The fines and superfines can be fed into the casing 1 at any lengthwise position provided that the coarse particles, at least a major portion of the fines, and a minor portion of the superfines, gravitate downwardly in the casing 1, and the remaining superfines and any fines are entrained in the upwardly flowing gas stream. From this it will be apparent that the gas stream must be fed into the casing 1 at a position below that at which the coarse particles are fed thereto and below the gas outlet portion 18, and that the fines and superfines must be fed into the casing 1 at a position at least at the same level as that at which the gas stream is fed thereto.

The fines, superfines and treating gas can even be fed into the container 6 provided the height of the packed particulate bed therein is low enough for the treating gas to permeate upwardly therethrough.

The following Table I gives experimental results of the above apparatus used for preheating, and drying by heated nitrogen as the gas, coke oven feed containing the coarse particles, fines and superfines and for filtering a cupola dust mixture containing predominantly fines and superfines from a gas using crushed limestone as the major portion of the particulate material and air as the gas.

TABLE I

| GAS | | PARTICULATE | | | DUST EFFICIENCY | | DUST EMISSION RATE | |
|---|---|---|---|---|---|---|---|---|
| TYPE | RATE SCFM | TYPE | RATE lb/min | $P_{BED}$ in W.G. | As % of feed | As % of Fines | lb/Ton of Feed | gr/SCF |
| (1) Air | 7.6 | COF (D) | 1.19 | 1.0–1.5 | 99.97±0.01 | 99.89±0.04 | 0.56±0.19 | 0.13±0.04 |
| (2) Air | 10.0 | COF (D) | 1.11 | 1.5–2.5 | 99.96±0.03 | 99.88±0.08 | 0.78±0.55 | 0.18±0.12 |
| (3) Air | 12.5 | COF (D) | 1.20 | 1.5–2.5 | 99.93±0.04 | 99.82±0.12 | 1.35±0.92 | 0.33±0.22 |
| (4) N2/1000° F | 10.0 | COF (D) | 0.86 | 1.5–2.5 | 99.96±0.02 | 99.88±0.06 | 0.82±0.41 | 0.20±0.10 |
| (5) N2/1000° F | 10.0 | COF (4.5) | 0.63 | 1.0–4.0 | 99.77 | 99.31 | 4.63 | 1.10 |
| (6) N2/1100° F | 9.0 | COF (7.0) | 0.79 | 1.5–2.0 | 99.97 | 99.90 | 0.61 | 0.14 |
| (7) Air | 10.0 | CD/GB | | 2.5–5.0 | 99.92± .05 | 99.92± .05 | N.A. | 0.11±0.07 |
| (7) Air | 10.0 | CD/GB | | 2.5–3.5 | 99.92± .08 | 99.92± .08 | | 0.11±0.11 |

KEY TO TABLE I
(1) These are average results of 5 COF (D) tests each 10–30 min. in duration. COF (D) is dry coke oven feed the size distribution of which is given by Table II.
(2) These are results of 10 COF (D) tests, each 10–30 min. in duration. COF (D) defined as above.
(3) These are results of 3 COF (D) tests, each 10–20 min. in duration.
(4) These are results of 13 COF (D) tests, each 10 min. in duration.
(5) These are results of 1 test, 86 min. in duration. COF (4.5) is coke oven feed, with size distribution as above, but with 4.5% moisture.
(6) These are results of 1 test 76 min. in duration, COF (7.0) is coke oven feed, with size distribution as above, but with 7.0% moisture.
(7) These are results of 7 tests, each 12 min. in duration. The coarse particulate material was crushed limestone, having a size distribution as shown in Table II. The fines and superfines designated CD/GB, were fed into the casing with the gas. The size distribution of CD/GB is also given in Table II.

invention as described above it can, for example, be used for:

a. drying or roasting the particulate material, b. chemically reducing the particulate material, for example, using $H_2$ or $CO$ as the gas for chemically reducing a metal oxide forming the particulate material, c. filtration of particulate material from gases and in this respect is useful in reducing the pollution of the environment by dust particles in waste gas from industrial plant and d. desulfurizing stack gas, for example, using a limestone as the particulate material.

In different embodiments of the present invention fines and/or superfines of a particulate material are fed with the gas in the treating gas entry 4. An example of The following Table II descries the size distribution of the particulate materials treated according to Table I. The size distribution of each material is described incrementally and cumulatively based on standard mesh screen results. COF indicates coke oven feed which is crushed coal. The crushed limestone is a mixture to −⅛ inch size. The mixture was then screened to remove the substantial portion of the −50 mesh fraction. CD/GB is a mixture of cupola dust obtained from a cupola dust collector and glass beads pre-sized to −400 mesh 1000 mesh.

TABLE II

| MESH | | SCREEN ANALYSIS | | |
|---|---|---|---|---|
| | | COF. | CRUSHED LIMESTONE | CD/GB |
| Wt. % | on 12 | 31.0 | 56.1 | 1.9 |
| " | −12 | 69.0 | 43.9 | 98.1 |
| " | on 16 | 9.0 | 12.6 | 2.0 |
| " | −16 | 60.0 | 31.3 | 96.1 |
| " | on 20 | 10.0 | 10.9 | 2.9 |
| " | −20 | 50.0 | 20.4 | 93.2 |
| " | on 30 | 10.0 | 8.7 | 3.8 |
| " | −30 | 40.0 | 11.7 | 89.4 |
| " | on 40 | 8.0 | 7.0 | 5.1 |
| " | −40 | 32.0 | 4.7 | 84.3 |
| " | on 50 | 8.0 | 4.3 | 9.0 |
| " | −50 | 24.0 | 0.4 | 75.3 |
| " | on 70 | 6.2 | 0.05 | 17.5 |
| " | −70 | 17.8 | 0.35 | 57.8 |
| " | on 100 | 4.4 | 0.05 | 18.8 |
| " | −100 | 13.4 | 0.30 | 39.0 |
| " | on 140 | 3.6 | 0.05 | 9.9 |
| " | −140 | 9.8 | 0.25 | 29.1 |
| " | on 200 | 3.1 | 0.05 | 5.0 |
| " | −250 | 6.7 | 0.20 | 24.1 |
| " | on 270 | 2.2 | 0.05 | 4.8 |
| " | −270 | 4.5 | 0.15 | 19.3 |

FIGS. 3 to 5 show graphs prepared from the experimental results of particulate size measurements and temperature readings that were taken from thermocouples T.C. No. 1 to T.C. No. 6 during these experiments.

In FIG. 3 the weight percentage particle size distribution of the packed particulate bed is plotted as a function of the treating gas velocity in the casing 1 and coke oven feed rate thereto. The following table is a key to FIG. 3

| TREATING GAS VELOCITY | FEED RATE lbs./min. | |
|---|---|---|
| ft./min. | 0.4 | 1.0 |
| 215 | □--------□ | ■——■ |
| 350 | ○--------○ | ●——● |
| 430 | △--------△ | ▲——▲ |

In FIG. 4 the lower size limit of the packed particulate bed material is plotted as a function of the particulate material feed rate to the casing 1 and treating gas velocity therein. The percentage figures indicate the fraction of the particulate material below size D in the packed particulate bed. The particulate material feed rates are ▲——▲ = 1.0 lb./min. and
△---△ = 0.4 lbs./min.

FIG. 5 is a graph of the temperatures measured by the thermocouples T.C. No. 1 to T.C. No. 6, as a function of the time elapsed from the start of feed to the particulate material in minutes. The nitrogen gas fed in 9 SCFM at 538° C, the particulate coal feed was processed by the apparatus at a rate of 0.65 lbs./min., and the moisture content of the particulate material feed to the casing 1 was 6.0% and particulate material prodoct discharged by the screw conveyor 10 was 0.8%. The temperatures measured by the thermocouples are given by the corresponding number in a circle, thus:

1. is T.C. No. 1, measuring the temperature of the gas in casing 1.

2. is T.C. No. 2, measuring the temperature of the gas containing entrained particles and passing to the packed particulate bed retaining inlet 24.

3. is T.C. No. 3, measuring the gas temperature of the gas that has passed through the packed particulate bed, that is the temperature of the gas in the exhaust pipe 34.

4. is T.C. No. 4, measuring the temperature of the coarse particles containing fines, in the container 6 and above the packed particulate bed.

5. are T.C. No. 5 and 6, measuring the temperature of the coarse, fine and superfine particles in the outlet 8 from the packed particulate bed container 6.

Referring the FIG. 6, there is shown a different packed particulate bed retaining inlet for use with the apparatus shown in FIGS. 1 and 2. Similar parts to those shown in FIGS. 1 and 2 are designated by the same reference numerals and the previous description is relied upon to describe them. A curved inlet connection 22, from the pipe 12 shown in FIG. 2, has a downwardly curving baffle 52 for directing the gas and entrained particles to an opening 54 beneath six louvres 55 to 60.

A side wall portion 63 of the container 6, beneath the opening 54, is spaced outwardly beneath the opening 54, so that the opening 54 is at a position where the cross-sectional area of the packed bed 62 increases in a downward direction and gas stream and a portion of the entrained particles that is the relatively coarser fraction is deflected by the baffle 52 to impinge on an exposed surface 61, of the packed particulate bed 62, that is exposed by the opening 54.

In operation the baffle 52 deflects the gas stream and entrained particles fines and superfines downwardly, as shown by →, towards the slot 54 so that only the gas stream and the entrained relatively finer fraction are deflected, as shown by   , by the packed particulate bed surface 61 to enter the packed particulate bed 62 between the louvres 55 to 59. The relatively coarser fraction of the entrained particles are deflected downwardly, as shown by   , by the baffle 52 and are deposited on the surface 61 by the inertial forces of these particles and this advantageously reduces the filtering action required by the packed particulate bed between the louvres 55 to 59.

In a different embodiment, as shown dotted in FIG. 6, the container 6 has a side wall portion 64 instead of side wall portion 63, the curved inlet 22 has extension 66 so that the container 6 is of uniform cross-sectional area, and the lowermost louver 55 protrudes, by extension 68, into the interior of the container 6.

This embodiment functions in a similar manner to the embodiment having side wall portion 63. The extension 68 causes the packed particulate bed 62 to increase in cross-sectional area in a downward direction at the opening 54, and the exposed surface of the packed particulate bed 62 forms at 69.

In FIG. 7, where similar parts to those shown in FIGS. 1 and 2 are designated by the same reference numerals, the curved inlet connection 22 has a curved baffle 70 and leads to an opening 72 having six louvers 75 to 80 and a discharge container 82.

In the embodiment shown in FIG. 7 the gas and entrained particles, as shown by → is deflected by the curved baffle in a similar manner to that described above with reference to FIG. 6, so that the relatively coarser fraction of the entrained particles is deflected into the discharge container 82, as shown by   , while the relatively finer fraction of the entrained particles enters the container 6 between the louvers 75 to 80, as shown by   .

FIG. 8 is a schematic diagram of the apparatus shown in FIG. 1 and FIG. 9 consists of schematic diagrams showing various relationships between the flow of treating gas in the apparatus and the positions of the treating gas inlet and the top of the packed particulate bed. The symbols used in FIG. 8 are described as follows:

$Q_{TOTAL}$ is the flow rate of the treating gas entering the apparatus through the treating gas inlet.

Qu is the flow rate of that portion of the treating gas which flows upward along the casing. $Q_D$ is the flow rate of that portion of the treating gas which does not flow upward along the casing (shown in Figure).

Ru is the resistance encountered by the upwardly flowing portion of gas Qu.

$R_D$ is the resistance encountered by the portion of gas $Q_D$ which does not flow upwardly.

$H_F$ is the height of the particulate feed entry above the top of the particulate bed retaining gas outlet.

$H_G$ is the height of the treating gas entry above the top of the particulate bed retaining gas outlet.

$H_{PB}$ is the height of the packed particulate bed above the top of the particulate bed retaining gas outlet.

In this apparatus there exist the following relationships between the quantities just described:
1. $Q_{TOTAL} = Qu + Q_D$
2. $Qu \times Ru = Q_D \times R_D$ and $Qu = Q_D (R_{D/Ru})$
3. $H_G < H_F$ AND $H_{PB} < H_F$
4. $Ru \simeq$ constant if $H_{PB} < H_G$; $Ru = f(H_{PB} - H_G)$ if $H_{PB} > H_G$
5. $R_D = f(H_{PB})$ if $H_{PB} < H_G$ $R_D \simeq$ constant if $H_{PB} < H_G$ Since it is required that a major portion of the treating gas must flow upwardly in the casing, the following relationships must exist for the particular example given:
6. $Qu < Q_D$ or $Qu < 50\%$ of $Q_{TOTAL}$
7. $R_D < Ru$ From these relationships it can be seen that certain limitations exist for both $H_G$ and $H_{PB}$ as shown in cases (a), (b), and (c) of FIG. 9. In case (a), $H_G$ is too low, and $R_D < Ru$ and all values of $H_{PB}$. In case (b), $R_D = Ru$ at $H_{PB} = H_G$. This height could be called the critical height for the gas entry $H_{GCRIT}$. In case (c), $H_G < H_{GCRIT}$, and there exists a range of $H_{PB}$ for which $R_D < Ru$ and hence $Qu < Q_D$. This region is shaded and could be described as the acceptable operating range for $H_{PB}$. For this example, the major portion of $Q_{TOT}$ is assumed to be any portion such that $Qu > 50\%$ of $Q_{TOT}$. If a higher fraction of $Q_{TOT}$ is required to flow upward, then the critical higher $H_{GCRIT}$ and the range of $H_{PB}$ would vary accordingly. Furthermore, the considerations for this example are based on the assumption that the permeability of the packed particulate bed is essentially constant. Variations in packed particulate bed materials may necessitate variations in the permeability of the packed particulate bed being taken into account. It is also assumed that the packed particulate bed retaining, gas inlet does not extend upwardly beyond a height above which it will appreciably affect $R_D$.

The apparatus and method according to the present invention, provides a unique and advantageous means of performing a number of existing industrial treatments requiring the interaction of gases and particulate materials. As described herein, the apparatus and method according to the present invention interact the gas initially in an elutriation and/or fluidized bed configuration and subsequently in a packed bed configuration. The initial stage not only permits heat exchange and/or chemical reaction between the gas and particulate material but also separates the particulate material according to size in order to optimize the operation of the subsequent packed particulate bed stage. This stage not only permits heat exchange and/or chemical reactions between the gas and the particulate material but also permits removal of virtually all the finer particles of the particulate material from the gas with a minimum loss in pressure. The unique spatial relationship between the two stages described herein according to the present invention simplifies and facilitates transfer between the two stages of both the sized particulate bed material and the dirty gas.

The sequential operation of the two stages described herein according to the present invention in most instances makes redundant the operation of ancillary equipment which is required in known apparatus where the two stages are operated independently.

The equipment which the apparatus and method of the present invention makes redundant includes dust collection equipment for the elutriation/fluidization stage and particles sizing equipment for the packed bed stage. In addition to the elimination in most instances of all ancillary equipment, the retention of virtually all the particulate material within the two treatment stages greatly facilitates conservation of energy and material.

The process described herein according to the present invention is especially advantageous for particulate materials which either have a tendency to agglomerate or are susceptible to size reduction by attrition during handling. Agglomerating materials such as wet coal or ore cannot be sized by conventional methods, precluding their use in packed particulate bed filtration. The process described herein according to the present invention simultaneously dries and sizes the particulate material, thus overcoming this difficulty. However, this advantage is fully realized only if the packed particulate bed stage is attached and operated as described herein so that the fine particulate entrained in the gas during drying/sizing may be recovered (from the gas streams). In the case of friable materials, size reduction subsequent to conventional sizing will not only increase the pressure loss in the packed bed but also cause air pollution from fines being swept from the packed particulate bed and entrained in the exhaust gas.

In the process described herein, the close proximity of the sizing stage and the packed particulate bed stage and the simple gravitational transfer of the sized material to the packed particulate bed stage greatly minimizes postsizing attrition and its associated problems.

In summation, the process described herein is a self-regulating, self-contained process which facilitates the interaction of a treating gas with a wide range of particulate materials whose properties such as size distribution, agglomeration tendency, and friability make their treatmnt in conventional processes difficult and expensive.

We claim:
1. A method of treating a solid particulate material with a gas, comprising:
 a. feeding, as a major portion of the particulate material to be treated, a first feed comprising coarse particles predominantly in the range 30 mesh to ½ inch into an upper portion of an upwardly extending, elongated casing,
 b. feeding a particulate material treating gas into the casing at a position below the first feed thereto and below a gas outlet therefrom,
 c. feeding, as a minor portion of the particulate material to be treated, a second feed comprising at least

50% by weight of fines predominantly in the range 140 mesh to 30 mesh, the remainder being superfines, into the upwardly extending elongated casing at a position at least as high as the level at which the treating gas is fed thereto, d. allowing the coarse particles of the first feed, and at least a major portion of the fines, and a minor portion of the superfines, of the second feed to freely gravitate downwardly in the casing in counterflow to the flow of substantially all of the gas to the gas outlet, and accumulate as a packed particulate bed in a container sealed to the lower end of the casing and above means controlling the exit flow rate of particulate material from the container, e. maintaining, by the means controlling the exit flow rate of the particulate material from the container, the height of the packed bed so that it:
 i. covers a louvered, packed particulate bed retaining, gas inlet to one side of the container for passage of gas, fines and superfines to the packed bed therein,
 ii. covers a louvered, packed particulate bed retaining, gas outlet facing the louvered, packed particulate bed retaining, gas inlet from another side of the container for passage of gas from the packed bed therein, and
 iii. causes substantially all of the treating gas to flow upwardly as a gas stream along the casing so that the remaining superfines and any remaining fines are entrained in the gas stream and are carried thereby upwardly along the casing as entrained particles to the gas outlet from the casing, f. conveying the entrained particles solely by means of the gas stream pressure in the casing, from the casing gas outlet, downwardly by a pipe having a substantially unobstructed bore and finally extending along a curved path to the louvered packed particulate bed retaining, gas inlet, g. conveying at least a fraction of the entrained particles finer than the remainder thereof through the louvered, packed particulate bed retaining, gas inlet by the gas stream, h. filtering a substantial portion of the entrained particles, conveyed by the gas stream through the packed particulate bed retaining, gas inlet, by passage of these entrained particles and at least a substantial portion of the gas stream through the packed particulate bed, in a transverse direction to the direction of flow of the packed particulate bed, towards the louvered, packed particulate bed retaining, gas outlet, and i. conveying gas of the gas stream escaping from the container through the louvered, packed particulate bed retaining, gas outlet and upwardly and away therefrom and wherein, j. the particulate material gravitating downwardly in the casing is directed by means of an inclined baffle towards a portion of the container interior adjacent the louvered, packed particulate bed retaining, gas inlet, so that the packed particulate bed has a predominance of the relatively finer particles therein adjacent the louvered, packed particulate bed retaining gas inlet, and a predominance of the relatively coarser particles therein adjacent the louvered, packed particulate bed retaining, gas outlet.

2. A method according to laim 1, wherein a curved baffle deflects a coarser fraction of the entrained particles, than the remainder towards a surface of the packed particulate bed which is exposed by an opening in the container and extending lengthwise beneath the louvres of the louvered, packed particulate bed retaining, gas inlet at a position where the cross-sectional area of the packed bed increases in a downward direction.

3. A method according to claim 1, wherein a curved baffle deflects a coarser fraction of the entrained particles than the remainder away from the louvered, packed particulate bed retaining gas inlet and into a discharge container.

4. Apparatus for treating a solid particulate material with a gas, comprising:
 a. an upwardly extending, elongated casing having a gas outlet, and inlet means for:
   i. as a major portion of the particulate material to be treated, a first feed comprising coarse particles predominantly in the range 30 mesh to ½ inch, to an upper portion of the casing,
   ii. a particulate material treating gas at a position which is below the first feed to the casing and below the gas outlet,
   iii. as a minor portion of the particulate material to be treated, a second feed comprising at least 50% by weight of fines predominantly in the range 140 mesh to 30 mesh, the remainder being superfines, at a position at least as high as the level at which the treating gas is fed to the casing, whereby, in operation,
   iv. a particulate material treating gas will flow upwardly along at least a portion of the casing to the gas outlet, in counterflow to the coarse particles of the first feed and at least a major portion of the fines and a minor portion of the superfines of the second feed all of which will freely gravitate downwardly in the casing,
 b. a packed particulate bed container, beneath the said inlet means, having a particulate material outlet at the lower end thereof, and attached and sealed at the upper end to the lower end of the casing, for receiving therefrom as particulate material, the coarse particles of the first feed, and the fines and superfines of the second feed, that will freely gravitate downwardly along the casing,
 c. means attached to the particulate material outlet of the packed particulate bed container, for controlling the exit flow rate of particulate material therethrough, and in operation, retaining a packed particulate bed at a level in the packed particulate bed container so that a major portion of the treating gas entering the casing will flow upwardly therealong to the gas outlet entraining a major portion of superfines therein, and any fines not freely gravitating downwardly therein,
 d. a louvered, packed particulate bed retaining, gas inlet in one side of the packed particulate bed container, and below the packed particulate bed level thereof, for the passage of treating gas containing entrained particles thereto,
 e. a louvered, packed particulate bed retaining, gas outlet in another side of the packed particulate bed container, below the packed particulate bed level thereof and facing the louvered, packed particulate bed retaining, gas inlet, for the passage of treating gas therefrom
 f. a pipe having a substantially unobstructed bore with an inlet end thereof connected to the gas outlet from the casing, for conveying therefrom solely by means of the gas pressure in the casing the treating gas flowing upwardly along the casing with entrained particles, and an outlet end connected to the louvered, packed particulate bed, retaining gas inlet, for delivering the treating gas and entrained particles therethrough to the packed, particulate bed therein, such that entrained particles will be filtered from the treating gas and at least a major portion of the treating gas will leave the packed particulate bed container through the louvered, packed particulate bed retaining, gas outlet, and g. an inclined baffle in the container at a position above the louvered, packed particulate bed retaining, gas inlet and the louvered, packed particulate bed retaining, gas outlet, for directing particulate material gravitating downwardly therein towards a portion of the container interior adjacent to the wall of the container containing the louvered, packed particulate bed retaining, gas inlet, and form an inclined surface on a packed particulate bed sloping downwardly towards the wall of the container containing the louvered, packed particulate bed retaining, gas outlet.

5. Apparatus according to claim 4, wherein the lowermost louver of the louvered packed particulate bed retaining, gas inlet protrudes into the interior of the packed particulate bed container and an opening is provided in the packed particulate bed container, beneath the lowermost louver, and a baffle is provided in the inlet connection and extends along a downwardly, curved path to deflect relatively coarser particles, of particles entrained in the treating gas, towards the opening.

6. Apparatus according to claim 4, in which a discharge container is connected to a lower end of the inlet connection, and a baffle is provided in the inlet connection for deflecting a coarser fraction of the entrained particles into the discharge container.

* * * * *